United States Patent
Vignard et al.

(10) Patent No.: US 11,682,129 B2
(45) Date of Patent: Jun. 20, 2023

(54) ELECTRONIC DEVICE, SYSTEM AND METHOD FOR DETERMINING A SEMANTIC GRID OF AN ENVIRONMENT OF A VEHICLE

(71) Applicant: TOYOTA MOTOR EUROPE, Brussels (BE)

(72) Inventors: Nicolas Vignard, Brussels (BE); Ozgur Erkent, Le Chesnay (FR); Christian Laugier, Le Chesnay (FR); Christian Wof, Villeurbanne (FR)

(73) Assignee: TOYOTA MOTOR EUROPE, Brussels (BE)

( * ) Notice: Subject to any disclaimer, the term of this patent is extended or adjusted under 35 U.S.C. 154(b) by 223 days.

(21) Appl. No.: 17/273,841

(22) PCT Filed: Sep. 12, 2018

(86) PCT No.: PCT/IB2018/001106
§ 371 (c)(1),
(2) Date: Mar. 5, 2021

(87) PCT Pub. No.: WO2020/053611
PCT Pub. Date: Mar. 19, 2020

(65) Prior Publication Data
US 2021/0334556 A1  Oct. 28, 2021

(51) Int. Cl.
*G06T 7/521* (2017.01)
*G06T 7/143* (2017.01)
*G06V 20/58* (2022.01)
*G06F 18/22* (2023.01)
*G06F 18/25* (2023.01)

(52) U.S. Cl.
CPC .............. *G06T 7/521* (2017.01); *G06F 18/22* (2023.01); *G06F 18/251* (2023.01); *G06T 7/143* (2017.01);
(Continued)

(58) Field of Classification Search
CPC ........ G06V 20/58; G06V 10/22; G06V 20/13; G06K 9/6215; G06K 9/6289; G06T 7/143;
(Continued)

(56) References Cited

U.S. PATENT DOCUMENTS

2019/0103026 A1* 4/2019 Liu .................. G06V 20/58
2019/0188862 A1* 6/2019 Natroshvili ............. G06T 7/277
(Continued)

OTHER PUBLICATIONS

Maturana, Daniel Maturana et al: "Real-Time Semantic Mapping for Autonomous Off-Road Navigation" In: "Field and Service Robotics", Jan. 1, 2018 (Jan. 1, 2018), Springer International Publishing.
(Continued)

*Primary Examiner* — Santiago Garcia
(74) *Attorney, Agent, or Firm* — Dinsmore & Shohl LLP

(57) ABSTRACT

An electronic device for determining a semantic grid of an environment of a vehicle is provided. The electronic device is configured to: receive first image data of an optical sensor, the first image data comprising a 2D image of the environment, perform a semantic segmentation of the 2D image and project the resulting semantic image into at least one predetermined semantic plane, receive an occupancy grid representing an allocentric bird eye's view of the environment. The control device further includes a neural network configured to determine a semantic grid by fusing the occupancy grid with the at least one predetermined semantic plane.

15 Claims, 2 Drawing Sheets

(52) U.S. Cl.
CPC .... *G06V 20/58* (2022.01); *G06T 2207/20084* (2013.01)

(58) Field of Classification Search
CPC . G06T 2207/20084; G06T 2207/20081; G06T 2207/20221; G06T 2207/30252; G06T 7/521; G06T 7/174
See application file for complete search history.

(56) References Cited

U.S. PATENT DOCUMENTS

| | | | | |
|---|---|---|---|---|
| 2019/0278292 | A1* | 9/2019 | Levinson | G06T 17/05 |
| 2019/0278293 | A1* | 9/2019 | Levinson | G06T 17/20 |
| 2020/0302681 | A1* | 9/2020 | Totty | G06T 7/74 |
| 2020/0402300 | A1* | 12/2020 | Ding | G06K 9/6289 |

OTHER PUBLICATIONS

Chenyang Lu et al: "Monocular Semantic Occupancy Grid Mapping with Convolutional Variational Auto-Encoders", arxiv.org, Cornell University Library, 201 Olin Library Cornell University Ithaca, NY 14853, Apr. 6, 2018 (Apr. 6, 2018).

Timo Korthals et al: "Multi-Modal Detection and Mapping of Static and Dynamic Obstacles in Agri culture for Process Evaluation", Frontiers in Robotics and AI, vol. 5, Mar. 27, 2018 (Mar. 27, 2018), p. 28.

* cited by examiner

ELECTRONIC DEVICE, SYSTEM AND METHOD FOR DETERMINING A SEMANTIC GRID OF AN ENVIRONMENT OF A VEHICLE

CROSS REFERENCE TO RELATED APPLICATIONS

This application is a national phase of International Application No. PCT/IB2018/001106 filed on Sep. 12, 2018, the entire contents of which are herein incorporated by reference.

FIELD OF THE DISCLOSURE

The present disclosure is related to an electronic device, system and method for determining a semantic grid of an environment of a vehicle, in particular based on 2D image data of a monocular camera.

BACKGROUND OF THE DISCLOSURE

Modern vehicles include object detection algorithms that are used to enable collision warning or avoidance and other active safety applications. In particular autonomous vehicles require to perceive and comprehend their surroundings accurately in order to navigate safely and successfully. The limited capacity of the sensors, occlusions, complexities and uncertainties in the environment make it a challenging task.

It has been proposed to use several types of sensors and mixing active and passive sensors. Introducing an architecture with active sensors (Lidar, Radar . . . ) and passive sensors (camera, inertial sensor) can improve the perception of the scene.

Passive sensors such as cameras for example, are inexpensive and provide dense and rich appearance information. The image information they provide is however very sensitive to environmental changes and current computer vision algorithms suffer from performance drops when processing such image information.

Active sensors such as lasers on the other hand, provide sparser depth and heading measurements. Point clouds generated by a laser or images recorded by a camera have been extensively used to detect generic objects in urban environments.

Deep Learning is arguable the dominant methodology for autonomous systems and assistance systems in intelligent vehicles. Adopted by most of the major industrial players in the field, the high capacity of deep networks allows them to create high level semantic predictions from low level sensor data (RGB images of monocular cameras, 3D images of stereo cameras, LIDAR etc.). On the downside, handling uncertainty in a principled way is still a difficult task with deep models alone. Bayesian techniques, on the other hand, have a built-in capability for managing uncertainty with a long history of applications in sensor fusion.

A widely used method to comprehend the surroundings is to construct occupancy grids. Occupancy grids are spatial 2D maps of the environment which also model regions which contain moving objects, cf. e.g.:

L. Rummelhard, A. Negre, and C. Laugier, "Conditional monte carlo dense occupancy tracker," in ITSC. IEEE, 2015, pp. 2485-2490.

The cells of these grids contain the probability of the state of a cell. One of the advantages of the occupancy maps is that they are dense and provide information about free space which is important for vehicles and mobile robots. Another advantage is that they do not depend on the type of the sensor. Since the model is generative, different types of sensors can be integrated easily by adapting the observation model. Compared to discriminative methods, no re-training is necessary.

However, although these models provide an accurate map of the scene with possible obstacles, they do not provide the semantics of the cells, which are important for decision making.

Furthermore, various studies have been made in the field of Semantic segmentation of RGB images.

For example, it is proposed to improve the perception capability of intelligent vehicles in complex urban environments by using the meta-knowledge acquired from a built Semantic Context image applied on evidential grids constructed from the Stereo Vision, cf.:

Bernades, et. al.: Stereo Vision for Dynamic Urban Environment Perception Using Semantic Context in Evidential Grid, 2015 IEEE 18th International Conference on Intelligent Transportation Systems.

Furthermore WO2017214595 (A1) discloses a system and method for performing three-dimensional semantic parsing of indoor spaces.

A method and system for computationally performing scene analysis of semantic traffic spaces on the basis of an adaptive spatio-temporal ray-based approach is known from JP2016115334 (A)

CN107066507 (A) refers to a semantic map construction method based on cloud robot mixed cloud architecture.

SUMMARY OF THE DISCLOSURE

Currently, it remains desirable to provide an electronic device, system and method for determining a semantic grid of an environment of a vehicle which represents an occupancy grid containing semantic information.

Therefore, according to the embodiments of the present disclosure, it is provided an electronic device for determining a semantic grid of an environment of a vehicle (i.e. the semantic grid represents the environment).

The electronic device being configured to: receive first image data of an optical sensor, the first image data comprising a 2D image of the environment, perform a semantic segmentation of the 2D image and project the resulting semantic image into at least one predetermined semantic plane, receive an occupancy grid representing an allocentric bird eye's view of the environment, wherein the control device further comprises: a neural network configured to determine a semantic grid by fusing the occupancy grid with the at least one predetermined semantic plane.

By providing such an electronic device, an electronic device can be obtained which determines (or estimates) an occupancy grid containing detailed semantic information (i.e. the semantic grid according to the disclosure). The semantic characteristics may include classes like e.g. road, car, pedestrian, sidewalk, building, car, vegetation, etc. To this end, information from multiple sensors (LIDAR, radar, odometry and monocular RGB camera) may be leveraged and fused. Desirably a hybrid approach may be used leveraging i) the high-capacity of deep neural networks as well as ii) Bayesian filtering, which is able to model uncertainty in a unique way.

The relation between the segmented image and the semantic plane may be determined based on projective geometry.

The semantic plane is desirably predetermined in the sense that its geometrical characteristics (i.e. its position and/or orientation in space) are predetermined. The "content" of the semantic plane is desirably the projected segmented 2D image (i.e. which make the predetermined plane a "semantic" plane).

The semantic image may be projected to the semantic plane by transforming the coordinate system of the semantic image such that it matches with the coordinate system of the occupancy grid.

Accordingly, the projected semantic image and the occupancy grid may have compatible spatial coordinates.

For example, the at least one predetermined semantic plane may be parallel to an allocentric bird eye's view and/or parallel to the ground plane with a predetermined distance to the ground plane.

The at least one predetermined semantic plane may overlap the occupancy grid in the allocentric bird eye's view.

Accordingly, the projected semantic image and the occupancy grid may cover an identical area of the environment.

The resulting semantic image may be projected into a plurality of predetermined parallel semantic planes, each having a different predetermined distance to the ground plane. For example, the plurality of parallel semantic planes may form a layered 3D map.

The 2D image may be segmented by assigning each image pixel with a semantic label. In this way segments may be generated in the image, wherein the pixels in each segment have the same label.

The at least one semantic plane may comprise a plurality of (semantic) plane cells, each plane cell comprising a semantic label. In other words, since the 2D image may comprise a plurality cells, the semantic plane, i.e. the projected segmented 2D image may comprise (semantic) cells, as well.

The semantic planes may comprise each a plurality of (semantic) plane cells, wherein each pixel of the semantic image may be assigned to a plane cell in at least one of the semantic planes.

The occupancy grid may comprise a plurality of occupancy grid cells, each indicating an occupancy state, e.g. free cells, statically occupied cells, dynamically occupied cells and unknown cells.

Accordingly, the received occupancy grid may be a non-semantic occupancy grid. The received occupancy grid may be estimated based on a 3D point cloud of the environment processed by a Bayesian particle filter.

The 3D point cloud may be generated by an active sensor (e.g. a Lidar) comprising a plurality of scan areas distributed over the environment.

The neural network may be further configured to: fuse the occupancy grid with the plurality of predetermined semantic planes by estimating at least one of the plane cells in the semantic planes which matches with an occupancy grid cell.

The neural network may be further configured to:
fuse the occupancy grid with the predetermined semantic planes by selecting a plane cell of the semantic planes based on the grid state of an overlapping occupancy grid cell, and
assigning an overlapping occupancy grid cell with the semantic label of the selected plane cell.

As stated above, the spatial coordinates of the projected semantic image (i.e. the semantic planes) and the occupancy grid may have compatible spatial coordinates. The objective is to train a learned mapping which integrates the two representations into a segmented occupancy grid (i.e. the semantic plane). The underlying assumption is that objects with height h<D are visible in the 2D image and are in the limits of the occupancy grid. Then, if the distance between the semantic planes is small enough, at least one of the points in these planes will have the correct label of the object, and the learned mapping can pick up the integration with the occupancy grid.

The control device may further comprises:
a further neural network configured to perform a semantic segmentation of the 2D image.

The neural network may be a convolutional—deconvolutional geometry fusion network.

The semantic grid may comprise a plurality of cells. For example, each cell may be assigned with a semantic information, the semantic information e.g. comprises a semantic class and a probability for each class.

The disclosure further relates to a system (in particular for a vehicle or a moveable robotic system) for determining a semantic grid of an environment of a vehicle, comprising: an electronic device as described above, an optical sensor (e.g. a passive optical sensor), configured to generate first image data comprising a 2D image of the environment, and, an active sensor (desirably a scanning sensor, e.g. LIDAR) configured to generate second data comprising a 3D point cloud of the environment representing a plurality of scan areas distributed over the environment (in particular outside the vehicle).

The disclosure further relates to a vehicle comprising a system as described above. However, the disclosure may also relate to any robotic system comprising a system as described above.

The optical sensor may be a monocular camera or a set of monocular cameras. In the latter case, the set of monocular cameras may e.g. produce together a panoramic image of the environment.

The system may further comprise an odometry device configured to measure the motion of the vehicle and/or to generate odometry data of the vehicle.

Finally, the present disclosure also relates to a method of determining a semantic grid of an environment of a vehicle. The method comprises the steps of: receiving first image data of an optical sensor, the first image data comprising a 2D image of the environment, performing a semantic segmentation of the 2D image and projecting the resulting semantic image into at least one predetermined semantic plane, receiving an occupancy grid representing an allocentric bird eye's view of the environment, wherein a neural network determines a semantic grid by fusing the occupancy grid with the at least one predetermined semantic plane.

The method may comprise further method steps which correspond to the functions of the electronic device as described above.

The described method may be suitable for any kind of robotic system, not only for vehicles.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
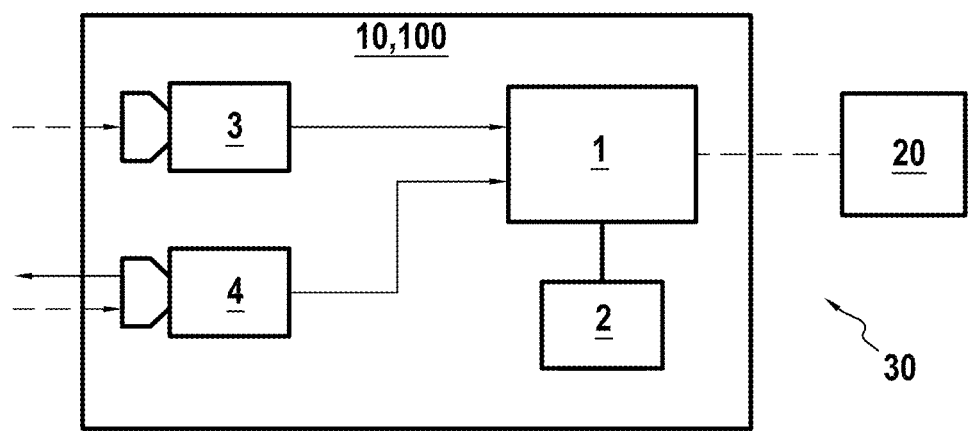
FIG. 1 shows a block diagram of a system with an electronic device according to embodiments of the present disclosure.

FIG. 1 shows a block diagram of a system 10 with an electronic device 1 according to embodiments of the present disclosure. The system may have various functions, e.g. may be a robotic system. For example it may be moveable, e.g. has drivable wheels, and it may have means for retrieving an object, e.g. at least one gripper. It may further be integrated in or constitute a vehicle 100.

The electronic device 1 carries out a computer vision algorithm for determining a semantic grid of an environment of the system. This step desirably comprises detecting the presence and location of objects in the sensed scene and determining the semantic class of said objects, i.e. whether an object is a road, car, pedestrian, sidewalk, building, car, vegetation, etc. Further, when for example vehicles and other objects are detected, an application software may use the object detection information to provide warnings or take actions as appropriate.

The electronic device 1 may additionally carry out further functions in the system 10 and/or the vehicle 100. For example, the electronic device may also act as the general purpose ECU (electronic control unit) of the system. The electronic device 1 may comprise an electronic circuit, a processor (shared, dedicated, or group), a combinational logic circuit, a memory that executes one or more software programs, and/or other suitable components that provide the described functionality. In other words, device 1 may be a computer device. The device 1 may be connected to a memory 2, which may store data, e.g. a computer program which when executed, carries out the method according to the present disclosure.

The electronic device 1 is further connected to a (passive) optical sensor 3, in particular a digital camera. The digital camera 3 is configured such that it can record a scene in front of the vehicle 100, and in particular output digital data providing appearance (color, e.g. RGB) information of the scene. The camera 3 is desirably a monocular camera which is configured to generate first image data comprising a 2D image of the environment. There may also be provided a set of monocular cameras which generate a panoramic 2D image.

The electronic device 1 is further connected to an active sensor 4, in particular a LiDAR sensor, a laser sensor, an ultrasound sensor, or a radar sensor. The active sensor may be a radar or an active optical sensor, in particular a laser sensor and/or a LiDAR sensor. The active sensor may be configured to generate second data comprising a 3D point cloud of the environment representing a plurality of scan areas distributed over the environment.

The outputs of the (passive) sensor 3 and the active sensor 4 are transmitted to the electronic device 1. Desirably, the outputs are transmitted instantaneously, i.e. in real time or in quasi real time. Hence, a sensed object can also be recognized by the electronic device in real time or in quasi real time.

The system 10 may be additionally connected to an external server 20, in order to form together a system 30. The server 20 may be used to provide and eventually update the algorithms carried out by the electronic device 1. Device 1 may be connectable to the server. For example the electronic device 1 may be connected to the server 20 via a wireless connection. Alternatively or additionally the electronic device 1 may be connectable to the server 20 via a fixed connection, e.g. via a cable.

Figure 2:
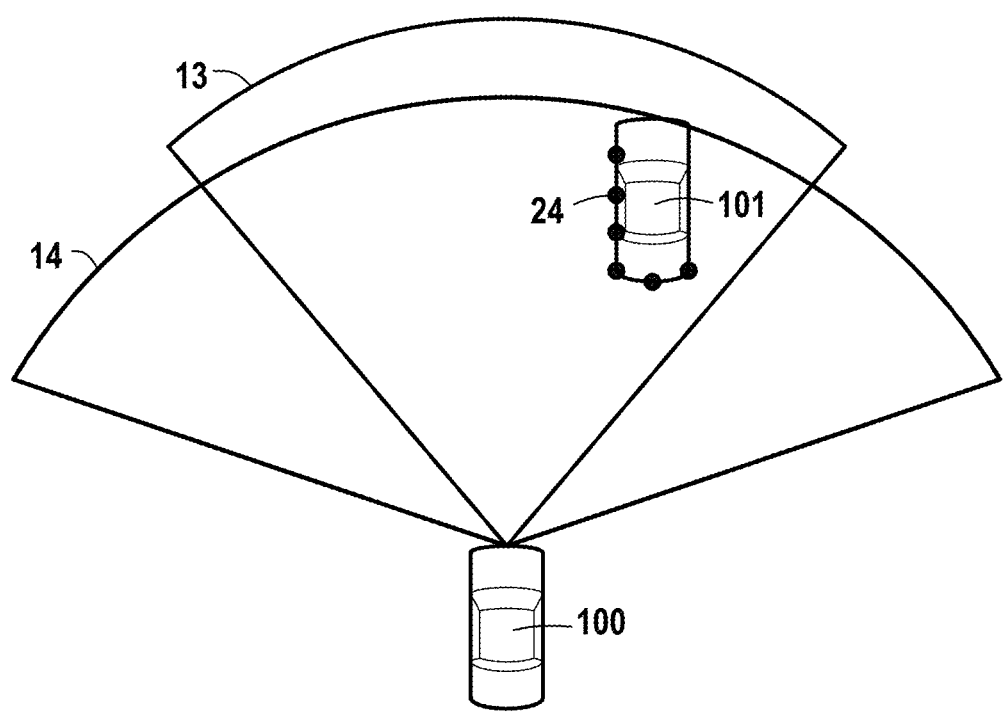
FIG. 2 shows a schematic scene in bird eye sensed by the system view according to embodiments of the present disclosure.

FIG. 2 shows a schematic scene in bird eye sensed by the system view according to embodiments of the present disclosure.

The vehicle 100 scans a scene in front of it with the digital camera 3 having a field of view 13 and with a LiDAR sensor 4 having a field of view 14.

Camera sensors may detect objects such as pedestrians, cars (as the target vehicle 101), traffic lights, traffic signs, etc. A digital camera may provide relatively dense data (pixel space), color and appearance of objects. This information is desirable to understand the scene around the vehicle, i.e. to generate semantic information. However, this sensor does not provide reliable depth information but is merely a 2D sensor.

LiDAR sensors may detect objects and provide range measurements to those objects. LiDAR sensors are desirable because they are able to provide depth information, i.e. a 3D point cloud of the environment which represents an occupancy grid. Said occupancy grid is especially useful to indicate which (3D) regions of the environment are occupied by objects. However, the data generated by LiDAR sensor is less useful to obtain semantic information of the objects in the environment. A separate scan point 24 may be provided for every ½° across the field-of-view of the sensor. For example an object 101 may be detected in front of the host vehicle 100. Thus there are multiple scan points 24 that are returned that identify the distance of the object 101 from the host vehicle 100. This detection though lacks any semantic information, i.e. that the detected object 101 is in this example a vehicle.

Figure 3:
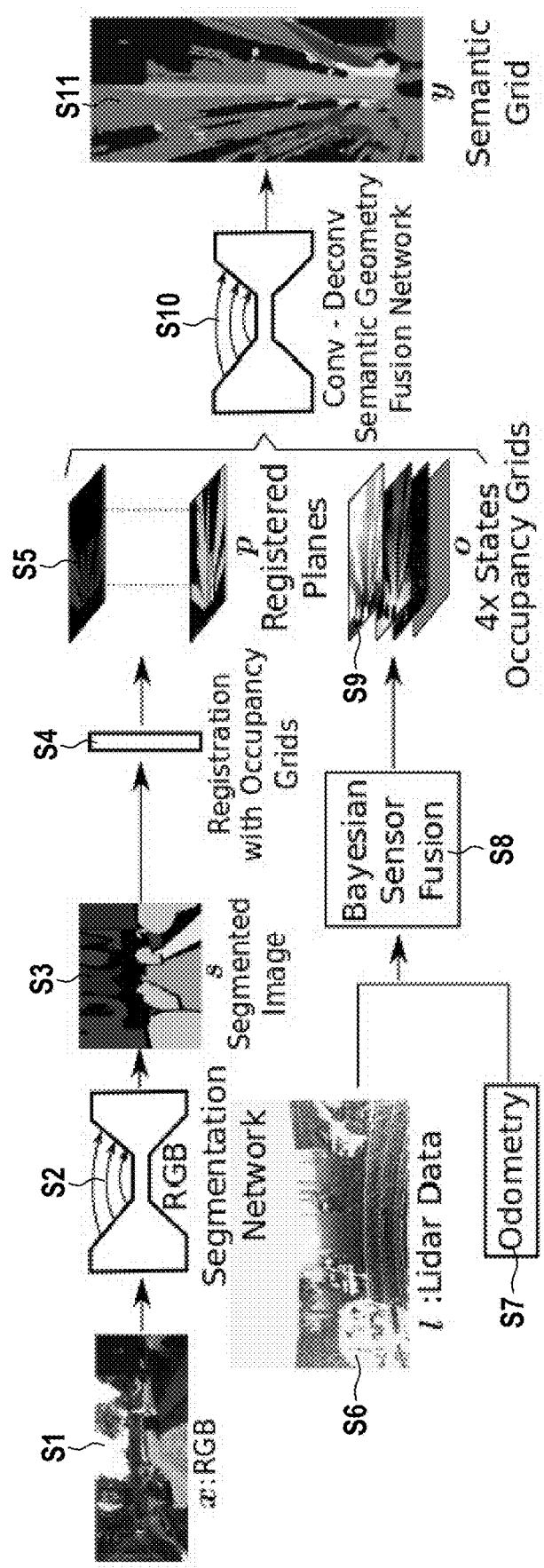
FIG. 3 shows a schematic flow chart of the steps of a method for determining a semantic grid according to embodiments of the present disclosure.

FIG. 3 shows a schematic flow chart of the steps of a method for determining a semantic grid according to embodiments of the present disclosure.

In short, the method fuses 3D point cloud input I (step S6) from a LIDAR with 2D image input x from an RGB camera (step S1) in order to obtain a semantic grid y (step S11) from a bird's eye view centered on the system.

In more detail, the LIDAR input I (step S6) is geometrically and temporally integrated with a Bayesian particle filter (step S8) to produce an occupancy grid o (step S9). This grid has the advantage of holding a 360 degree view of the environment and of encoding the full LIDAR observation history through temporal integration. However, its semantic information is low, as the states of each cell encode possible values (e.g. empty; occupied; in motion) but do not contain fine-grained information on the semantic classes of occupied cells. This information is available from the output s of a deep network (step S3) taking as input the RGB image x. However, the two representations are of different types (3D projective geometry vs. bird's eye view) and need to be fused.

In the following sub sections, it will be described the different parts of this method: i) semantic segmentation of the RGB input image (steps S1 to S5), ii) occupancy grid estimation from LIDAR input (steps S6 to S9), and iii) learned fusion of these two representations with a deep neural network (steps S10, S11). It is noted that the steps shown in FIG. 3 may represent an operation step (e.g. segmentation of an RGB image) or a step of providing data (e.g. an RGB image).

A. Semantic Segmentation from Monocular RGB Input

A deep neural work (step 2) takes monocular RGB input x (step S1) and predicts an estimate of the segmentation s (step S3). High capacity neural networks are capable of estimating high-level semantic information from low-level input data provided that they are trained on sufficiently large databases. It is desirably followed the standard practice of pre-training the model first for classification on a large-scale predefined dataset followed by fine-tuning on the target datasets for segmentation The main challenge in image segmentation using deep networks is to preserve resolution, i.e. to provide segmentation at the same spatial resolution as the input. The difficulty lies in the fact, that internally, convolutional neural networks perform downsampling and pooling between successive layers in order to increase the spatial support of convolutional filters in later layers.

Desirably the SegNet variant is used for obtaining semantic information s, cf. e.g.:

V. Badrinarayanan, A. Kendall, and R. Cipolla, "Segnet: A deep convolutional encoder-decoder architecture for image segmentation," IEEE PAMI, vol. 39, no. 12, pp. 2481-2495, 2017.

The accuracy of SegNet is not highest among other reported results, but its runtime/accuracy trade-off is very favorable. SegNet is an encoder-decoder network whose details will be given in the following sections.

We use the parameters from a previously trained version with a VGG16 architecture trained for object recognition. The pixels are classified by using a soft-max layer. The labels are e.g. road, car, sideways, vegetation, pedestrian, bicycle, building, signage, fence and unknown.

B. Bayesian Occupancy Grids

A Bayesian particle filtering (cf. step S8) processes the LIDAR data (cf. step S6) as well as odometry information (cf. step S7) from the vehicle's motion in order to robustly estimate an allocentric bird's eye view in the form of an occupancy grid. This occupancy grid contains desirably a 360 degree view of the environment around the car and integrates information from the observation history through temporal filtering; however, it does not include fine-grained semantic classes.

In particular, the Bayesian Filter method is used to predict the occupancy and dynamic state of the cells in an occupancy grid map. This is achieved via deducting the occupancy probability given the sensor measurements for each cell and the previous states of the cell. CMCDOT (Conditional monte carlo dense occupancy tracker) may be used to obtain the probability, which is one of the recent Bayesian Filter methods to deduct the probabilities of the grid occupancies and dynamics, cf. e.g.:

Rummelhard et. al., "Conditional monte carlo dense occupancy tracker," in ITSC. IEEE, 2015, pp. 2485-2490.

First of all, instead of defining each cell as being occupied or not, CMCDOT introduces free state, statically occupied state, dynamically occupied state and unknown state. Free state represents the probability of a cell being free of any type of object. However, it should be noted that it does not necessarily imply the area where the vehicle can navigate to. For example, a sideways has a high probability of being free, but it would not be allowed to drive onto this free area due to its consequences. Statically occupied cell refers to the probability of a cell being occupied by an obstacle. Although it may be part of a permanently static structure like a building, it can also be part of a temporary static object, like a parked car. The dynamically occupied cells show the probability of the cell being occupied by a dynamic object. This kind of state also includes information about the velocity of the cell which are contained in the particles in that cell. Only the particles in this dynamic cell regions have velocity related information, which reduces the computation complexity significantly.

The first step of a Bayesian filter is to predict the current state probabilities from the previous state probabilities. To be able to achieve this, transition probabilities are defined. They represent the probability of the transition of a state in the previous time into another state in the current time. For example a statically occupied cell will remain as a statically occupied cell with a transition probability of 0:99, or it will become a dynamically occupied cell with a transition probability of 0:01. The transition probabilities also include the velocity information.

In the next step, the updated probabilities are evaluated. A probabilistic sensor model may be used for the observation model, cf. e.g.:

S. Thrun, W. Burgard, and D. Fox, Probabilistic robotics. MIT press, 2005.

It should be noted that due to the flexibility of the observation model, the Bayesian Filter can be used with a wide variety of sensors which is one of its main advantages. In this exemplary embodiment, e.g. LIDAR sensor data I are used.

After the evaluation step, the state distributions are estimated. A particle re-sampling is applied to assign new particles to new dynamically occupied regions and to focus on significant regions. After particle re-sampling, the iteration continues with prediction step if it is necessary. Although the occupancy and dynamic information about the state of the cells can be obtained accurately via a Bayesian Filter method, this cannot always be used to plan the next action of the vehicle. As aforementioned, the same state may refer to different semantic classes. For example a free cell can be a road or a sideways which would result in different behavior. Therefore, the occupancy grids are enriched with the semantic information.

Four occupancy grid states o are used (cf. step S9) as an input to the network to estimate the semantic grid. The four states of the occupancy grids represent e.g. the free cells, statically occupied cells, dynamically occupied cells and unknown cell.

C. Fusing Geometry and Semantic Information

Fusing the geometric information from the occupancy grid o (cf. step S9) obtained from LIDAR input I and the semantic information s (cf. step S3) obtained from the projective RGB input x is a non trivial problem, which cannot be solved with direct geometric computations, unless depth information is available together with the RGB input: one point in projective images x or s can potentially correspond to several 3D points in the scene and therefore to several points in the grid o. Depth from stereo could provide sufficient constraints. An alternative solution is proposed, where this fusion process is learned, avoiding the calculation of disparity maps from stereo.

Directly learning this fusion in a black box strategy by providing both representations as an input to a neural network would be sub-optimal. The network would need to learn multiple mappings, namely (i) the geometric transformation between the projective view and the bird's eye view, (ii) solving the point-to-line correspondence due to missing depth information, and (iii) fusing occupancy grid states with semantic classes from the segmentation. Whereas (ii) and (iii) are inevitable in this approach, (i) can be solved (up to the point-to-line correspondence) directly.

Figure 4:
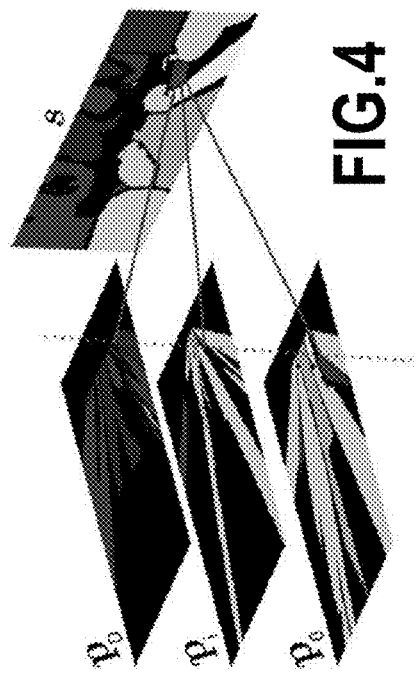
FIG. 4 schematically shows the alignment of projective view to bird's eye view (only three planes are shown) according to embodiments of the present disclosure.

For this reason, an intermediate representation p is introduced (cf. step S5), which transforms the projective input s to a bird's eye view representation compatible with the coordinate system of the occupancy grid o, as also shown in FIG. 4.

FIG. 4 schematically shows the alignment of projective view to bird's eye view (only three planes are shown) according to embodiments of the present disclosure.

Each cell in p takes values from the alphabet of semantic classes, i.e. the same alphabet used for segmented images s. The objective is to create a representation, where a cell with given spatial coordinates (x; y) corresponds to a grid cell in o with the same coordinates. To model the ambiguity resulting from the missing depth information, p={pi} is a layered 3D map organized as a collection of D planes pi which are parallel to the ground. Here, i index different heights. In what follows, the time index t has been dropped, as fusion is calculated separately for each time instant t.

The distance between the ground and each plane pi is di. D planes are assumed with distance $\delta d$ to each other, therefore the distance of $i^{th}$ plane to ground is $i\delta d$. The relation between an image and a plane is straight forward if the camera is calibrated and can be derived from projective geometry. For each of the planes pi, for any point on this plane, first the coordinates of the point
$\{x_i^j, y_i^j, z_i^j\}$
are found in the image plane by using a transformation $p_i tf$
from plane to image coordinates $$(\hat{x}_i^j, \hat{y}_i^j, \hat{z}_i^j, 1)^T = p_i tf(x_i^j, y_i^j, z_i^j, 1)^T$$

the corresponding pixel in the image plane can be found as $$\begin{pmatrix} px_i^j \\ py_i^j \\ 1 \end{pmatrix} = K \begin{pmatrix} \hat{x}_i^j/\hat{z}_i^j \\ \hat{y}_i^j/\hat{z}_i^j \\ 1 \end{pmatrix} \quad (1)$$

where K is the camera calibration matrix. $px_i^j$ and $py_i^j$ are the pixel coordinates of the projection of the $j^{th}$ point in the $i^{th}$ plane. For a given pixel in the segmented image s, its semantic label is assigned to a set of points in the representation p, each of which corresponds to a different depth value (and therefore to a different height value).

As stated above, the spatial coordinates of representations p and o are compatible. The objective is to train a learned mapping which integrates the two representations into a segmented occupancy grid o. The underlying assumption is that objects with height h<D are visible in the RGB image and are in the limits of the occupancy grid. Then, if $\delta d$ is small enough, at least one of the points in the projected planes p will have the correct label of the object, and the learned mapping can pick up the integration with the occupancy grid.

D. Joint Dimensionality Reduction and Fusion

The occupancy grid o and the intermediate representation p are both fed into a deep neural network (cf. step S10), which outputs the semantic grid y (cf. step S11). The semantic grid is a 3D tensor of the same spatial dimensions as the input tensors o and p. The model therefore needs to be resolution preserving, which is a non-trivial task if the intermediate layers of the network use any sort resolution reducing pooling. As also done for semantic segmentation, Conv-Deconv networks in the SegNet variant may be used including skip connections originally introduced e.g. in:

V. Badrinarayanan, A. Kendall, and R. Cipolla, "Segnet: A deep convolutional encoder-decoder architecture for image segmentation," IEEE PAMI, vol. 39, no. 12, pp. 2481-2495, 2017.

The input data consist of D+4 planes: 4 planes corresponding to the occupancy grid o and D planes corresponding to the intermediate representation p calculated from the segmented RGB image. The latter is categorical data, as each value from the alphabet corresponds to a semantic class label. The data is by definition unordered, which makes learning from it directly inefficient, as the learned mapping needs to be highly (and unnecessarily) complex. Therefore the number of data planes may be increased by encoding each of the D planes from p in a 1-in-K encoding ("hot-one"). This creates well-behaved data with the drawback of significantly increasing the size of the input representation: the input tensor has now DxC+4 planes, where C is the number of semantic classes.

Directly learning this representation is computationally inefficient and results in a network of an unreasonable large capacity. A dimensionally reduction layer may be added at the input of the encoder, which, as a first operation, reduces the input planes to a lower number. The number of planes is a hyper-parameters, which is set equal to C. This is implemented as 1×1 convolutions, which have the same effect as a pointwise non-linearity with spatially shared parameters. Dimensionality reduction and fusion are trained jointly, end-to-end.

The rest of the encoder part has e.g. 13 convolution layers similar to the well-known VGG16 network. Each encoder layer applies a convolution and obtains a set of features. These are then batch-normalized and an element-wise rectified-linear non-linearity (ReLU) is performed. Maxpooling is used to reduce the size of the images. The indices of the maximum values are kept and delivered to the decoder process which accelerates the decoding process. The decoder has e.g. 13 layers. Again a convolution is performed with a batch-normalization and ReLU. To upsample the images, the indices stored in the encoder layers are used. A multi-class softmax classifier is applied in the final layer to estimate the class probabilities of the pixels. Cross-entropy loss is used and the loss is taken as the sum of all the pixels in a batch.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An electronic device for determining a semantic grid of an environment of a vehicle, the electronic device being configured to:
   receive first image data of an optical sensor, the first image data comprising a 2D image of the environment,
   perform a semantic segmentation of the 2D image and project the resulting semantic image into at least one predetermined semantic plane to create a semantic plane,
   receive an occupancy grid representing an allocentric bird eye's view of the environment, wherein
   the control device further comprises:
      a neural network configured to determine a semantic grid by fusing the occupancy grid with the semantic plane.

2. The electronic device according to claim 1, wherein the semantic image is projected to the semantic plane by transforming the coordinate system of the semantic image such that it matches with the coordinate system of the occupancy grid.

3. The electronic device according to claim 1, wherein the at least one predetermined semantic plane is parallel to an allocentric bird eye's view and/or parallel to the ground plane with a predetermined distance to the ground plane, and/or the at least one predetermined semantic plane overlaps the occupancy grid in the allocentric bird eye's view.

4. The electronic device according to claim 1, wherein the resulting semantic image is projected into a plurality of predetermined parallel semantic planes, each having a different predetermined distance to the ground plane.

5. The electronic device according to claim 1, wherein the 2D image is segmented by assigning each image pixel with a semantic label.

6. The electronic device according to claim 1, wherein the at least one semantic plane comprises a plurality of plane cells, each plane cell comprising a semantic label, and/or the semantic planes comprise each a plurality of plane cells, wherein each pixel of the semantic image is assigned to a plane cell in at least one of the semantic planes.

7. The electronic device according claim 1, wherein the occupancy grid comprises a plurality of occupancy grid cells, each indicating an occupancy state.

8. The electronic device according to claim 7, wherein the neural network is configured to:
   fuse the occupancy grid with the plurality of predetermined semantic planes by estimating at least one of the plane cells in the semantic planes which matches with an occupancy grid cell.

9. The electronic device according to claim 8, wherein the neural network is configured to:
   fuse the occupancy grid with the predetermined semantic planes by selecting a plane cell of the semantic planes based on the grid state of an overlapping occupancy grid cell, and
   assigning an overlapping occupancy grid cell with the semantic label of the selected plane cell.

10. The electronic device according to claim 1, wherein the control device further comprises:
    a further neural network configured to perform a semantic segmentation of the 2D image.

11. The electronic device according to claim 1, wherein the neural network is a convolutional-deconvolutional geometry fusion network.

12. The electronic device according to claim 1, wherein the semantic grid comprises a plurality of cells, each cell being assigned with a semantic information, the semantic information in particular comprises a semantic class and a probability for each class.

13. A system for determining a semantic grid of an environment of a vehicle, comprising:
    an electronic device according to claim 1,
    an optical sensor, configured to generate first image data comprising a 2D image of the environment, and
    an active sensor configured to generate second data comprising a 3D point cloud of the environment representing a plurality of scan areas distributed over the environment.

14. The system according to claim 13, wherein the optical sensor is a monocular camera or a set of monocular cameras.

15. A method of determining a semantic grid of an environment of a vehicle, comprising the steps of:
    receiving first image data of an optical sensor, the first image data comprising a 2D image of the environment,
    performing a semantic segmentation of the 2D image and projecting the resulting semantic image into at least one predetermined semantic plane to create a semantic plane,
    receiving an occupancy grid representing an allocentric bird eye's view of the environment, wherein
    a neural network determines a semantic grid by fusing the occupancy grid with the semantic plane.

* * * * *